United States Patent
Namie et al.

(10) Patent No.: US 10,241,490 B2
(45) Date of Patent: Mar. 26, 2019

(54) CORRECTION DEVICE, CORRECTION DEVICE CONTROLLING METHOD, INFORMATION PROCESSING PROGRAM, AND RECORDING MEDIUM

(71) Applicant: OMRON Corporation, Kyoto-shi, Kyoto (JP)

(72) Inventors: Masaki Namie, Takatsuki (JP); Mikiko Manabe, Takatsuki (JP); Takashi Fujii, Kyoto (JP)

(73) Assignee: OMRON Corporation, Kyoto-shi (JP)

(*) Notice: Subject to any disclaimer, the term of this patent is extended or adjusted under 35 U.S.C. 154(b) by 0 days.

(21) Appl. No.: 15/343,250

(22) Filed: Nov. 4, 2016

(65) Prior Publication Data

US 2017/0153614 A1  Jun. 1, 2017

(30) Foreign Application Priority Data

Nov. 30, 2015 (JP) .................................. 2015-234143

(51) Int. Cl.
*G05B 19/048* (2006.01)
*G05B 13/02* (2006.01)
*G05B 13/04* (2006.01)
*G05B 19/042* (2006.01)

(52) U.S. Cl.
CPC ....... *G05B 19/048* (2013.01); *G05B 13/0265* (2013.01); *G05B 13/048* (2013.01); *G05B 19/0423* (2013.01); *G05B 2219/34013* (2013.01)

(58) Field of Classification Search
CPC .... G05B 13/048; G05B 17/02; G05B 19/404; G05B 19/42132; G05B 13/042; G05B 19/4063; G05B 2219/35286; G05B 2219/41119; G05B 2219/42018; G05B 2219/42128; G05B 2219/42129; G05B 19/42141
USPC ........................................ 318/400.02, 400.03
See application file for complete search history.

(56) References Cited

U.S. PATENT DOCUMENTS 5,666,034 A * 9/1997 Seoung .................... H02P 23/16
                                                    242/334.2
5,773,938 A * 6/1998 Seong .................... H02P 23/186
                                                    242/334.2
6,107,771 A * 8/2000 Maeda ................. G05B 19/404
                                                    318/600
(Continued)

FOREIGN PATENT DOCUMENTS

CN      1745352 A      3/2006
CN    101349893 A      1/2009
(Continued)

OTHER PUBLICATIONS

The extended European search report dated Mar. 28, 2017 in the counterpart European patent application.
(Continued)

*Primary Examiner* — Jorge L Carrasquillo
(74) *Attorney, Agent, or Firm* — MetroLexis Law Group, PLLC

(57) ABSTRACT

Improvement of following performance about a target value is achieved in a control system, particularly a feedback control system. A command value correcting device corrects a current-control-cycle command value received with a feedback controller using a current-control-cycle controlled variable of a control target.

10 Claims, 10 Drawing Sheets

(56) References Cited

U.S. PATENT DOCUMENTS

| | | | | |
|---|---|---|---|---|
| 6,674,261 | B2* | 1/2004 | Takahashi | B60L 15/025 318/714 |
| 7,016,779 | B2* | 3/2006 | Bowyer | F02D 41/0007 701/108 |
| 7,206,659 | B2* | 4/2007 | Hosokawa | G05B 19/404 700/159 |
| 7,254,461 | B2* | 8/2007 | Hosokawa | G05B 19/4063 700/173 |
| 7,548,035 | B2* | 6/2009 | Endo | B62D 5/046 318/400.02 |
| 7,622,875 | B2* | 11/2009 | Atarashi | B60L 15/025 310/154.33 |
| 7,960,940 | B2* | 6/2011 | Kariatsumari | H02P 21/22 318/400.01 |
| 8,150,580 | B2* | 4/2012 | Suzuki | B62D 5/046 701/41 |
| 8,264,181 | B2* | 9/2012 | Yamakawa | H02M 7/53873 318/432 |
| 8,295,951 | B2* | 10/2012 | Crisalle | G05B 13/048 700/29 |
| 8,594,828 | B2* | 11/2013 | Stephenson | G05B 13/048 162/198 |
| 8,649,884 | B2* | 2/2014 | MacArthur | G05B 13/048 700/40 |
| 8,810,187 | B2* | 8/2014 | Vu | H02P 8/38 318/400.09 |
| 8,855,833 | B2* | 10/2014 | Kumabe | B60W 50/045 701/1 |
| 2003/0030406 | A1* | 2/2003 | Takahashi | B60L 15/025 318/714 |
| 2004/0150363 | A1* | 8/2004 | Toyozawa | G05B 19/404 318/568.13 |
| 2005/0131620 | A1* | 6/2005 | Bowyer | F02D 41/0007 701/108 |
| 2006/0173571 | A1* | 8/2006 | Hosokawa | G05B 19/4063 700/177 |
| 2006/0173573 | A1* | 8/2006 | Hosokawa | G05B 19/404 700/193 |
| 2006/0186845 | A1 | 8/2006 | Terada et al. | |
| 2008/0018291 | A1* | 1/2008 | Atarashi | B60L 15/025 318/730 |
| 2008/0027609 | A1* | 1/2008 | Aoki | B62D 5/0463 701/43 |
| 2008/0097625 | A1* | 4/2008 | Vouzis | G05B 13/048 700/29 |
| 2008/0167779 | A1* | 7/2008 | Suzuki | B62D 5/046 701/42 |
| 2009/0015182 | A1* | 1/2009 | Kariatsumari | H02P 21/22 318/400.02 |
| 2009/0079371 | A1* | 3/2009 | Suzuki | H02P 21/16 318/400.02 |
| 2010/0082120 | A1* | 4/2010 | Stephenson | G05B 13/048 700/29 |
| 2010/0176757 | A1* | 7/2010 | Yamakawa | H02M 7/53873 318/400.09 |
| 2010/0268353 | A1* | 10/2010 | Crisalle | G05B 13/048 700/29 |
| 2012/0109414 | A1* | 5/2012 | Kumabe | B60W 50/045 701/1 |
| 2013/0030554 | A1* | 1/2013 | MacArthur | G05B 17/02 700/29 |
| 2013/0035914 | A1* | 2/2013 | Igarashi | G05B 13/041 703/2 |
| 2013/0043822 | A1* | 2/2013 | Vu | H02P 8/38 318/696 |
| 2015/0008861 | A1* | 1/2015 | Sonoda | G05B 13/04 318/504 |
| 2015/0256110 | A1* | 9/2015 | Aoyama | H02P 6/28 318/400.15 |
| 2015/0355633 | A1* | 12/2015 | Nagatani | G05B 19/4155 700/275 |
| 2016/0131057 | A1* | 5/2016 | Lahti | F02D 41/0077 701/103 |

FOREIGN PATENT DOCUMENTS

| | | |
|---|---|---|
| EP | 0845722 A2 | 6/1998 |
| JP | H4-199301 A | 7/1992 |
| JP | 2005-094964 A | 4/2005 |
| JP | 2006-252484 A | 9/2006 |
| JP | 2013-114274 A | 6/2013 |
| JP | 2014-002474 A | 1/2014 |

OTHER PUBLICATIONS

Chu Ji-Zheng et al., A Comparative Study of Combined Feedforward/Feedback Model Predictive Control for Nonlinear Systems, the Canadian Journal of Chemical Engineering, Dec. 1 2004, pp. 1263-1272, vol. 82, No. 6, XP009089785, Ottawa, CA.

Ping Zhou et al., DOB Design for Nonminimum-Phase Delay Systems and Its Application in Multivariable MPC Control, IEEE Transactions on Circuits and Systems II: Express Briefs, Aug. 1, 2012, pp. 525-529, vol. 59, No. 8, XP011456354, ISSN: 1549-7747, DOI: 10.1109/TCSII.2012.2204844, US.

The Japanese Office Action (JPOA) dated Aug. 28, 2018 in the counterpart Japanese patent application.

Ren Zheng-Yun et al., On-line Tuning of Feedback Corrective Coefficient of Model Predictive Control, Journal of Shanghai Jiaotong University, Jun. 30, 2003, p. 922-926, vol. 37 No. 6, China.

Chinese Office Action (CNOA) dated Oct. 9, 2018 in a counterpart Chinese Patent application.

\* cited by examiner

CORRECTION DEVICE, CORRECTION DEVICE CONTROLLING METHOD, INFORMATION PROCESSING PROGRAM, AND RECORDING MEDIUM

CROSS-REFERENCE TO RELATED APPLICATION

This application claims priority from prior Japanese Patent Application No. 2015-234143 filed with the Japan Patent Office on Nov. 30, 2015, the entire contents of which are incorporated herein by reference.

FIELD

The present invention relates to a correction device that corrects a command value provided to a feedback control system such as a servo driver.

BACKGROUND

There is known a control system in which, a command value generated from a target value (target orbit) in each control cycle is provided to the feedback control system such as the servo driver, whereby the feedback control system performs feedback control such that a controlled variable that is output of a control target such as a servo motor follows the command value. Conventionally, the following two methods are known as a method for improving the following performance about the target value in the control system. First, there is a method for correcting the command value by feedforward control in which information about the command value received with the feedback control system and information about a control gain of the feedback control system are used. Second, there is a method for correcting the command value using an inverse function of a total characteristic model of the feedback control system and the control target.

For example, Japanese Patent Unexamined Application No. 2014-2474 (published on Jan. 9, 2014) discloses a method for controlling the command value provided to a servo controller (feedback control system) by feedforward control in which models of a motor (control target) and a machine system (load machine) are used.

In the first method, the command value is corrected by a simple configuration that uses feedforward control in which information about the command value received with the feedback control system and information about a control gain of the feedback control system are used, and the following performance about the target value is insufficiently improved.

In the second method, the following performance can be achieved higher than the first method when the total characteristic model of the feedback control system and the control target has good accuracy. However, in the second method, an influence of a model error of the characteristic model is directly linked to degradation of the following performance. Resultantly, in the second method, sometimes the following performance about the target value degrades in the case that the characteristic model has poor accuracy.

Accordingly, the following performance about the target value is insufficiently improved in the control system, particularly the feedback control by the conventional first and second methods.

SUMMARY

An object of the present invention is to improve the following performance about the target value in the control system, particularly the feedback control.

According to one aspect of the present invention, a correction device that corrects a command value, which is generated from a target orbit in each control cycle and is received with a feedback control system that causes a controlled variable of a control target to follow the command value, the correction device includes: a controlled variable acquiring part configured to acquire the controlled variable of the control target in a current control cycle; and a command value corrector configured to correct the current-control-cycle command value, which is received with the feedback control system, using the current-control-cycle controlled variable acquired with the controlled variable acquiring part.

According to the above configuration, the correction device corrects the current-control-cycle command value provided to the feedback control system using the current-control-cycle controlled variable. Accordingly, in the correction device, the corrected command value can be provided to the feedback control system, so that the following performance about the target orbit can be improved in the control system including the correction device, particularly the feedback control system.

Preferably, the command value corrector corrects the current-control-cycle command value using the current-control-cycle controlled variable by model predictive control in which models of the feedback control system and the control target are used.

According to the above configuration, the command value corrector corrects the command value in the current control cycle using the current-control-cycle controlled variable as the input by model predictive control in which the models of the feedback control system and the control target are used. Accordingly, the correction device can correct the command value in the current control cycle using the model by the model predictive control. Therefore, an adverse effect on the control stability, which is caused by the construction of the control loop of the command value corrector having a relatively larger delay compared with the control loop of the feedback control system, can be reduced.

Preferably, the feedback control system is a servo driver in which a servo motor is a control target.

According to the above configuration, the correction device corrects the current-control-cycle command value provided to the servo motor using the current-control-cycle controlled variable. Accordingly, the correction device can provide the corrected command value to the servo motor, so that the following performance about the target orbit can be further improved in the control system including the correction device.

Preferably, the controlled variable acquiring part further includes a learning controller configured to output a correction amount of the command value generated in each control cycle from a next target orbit similar to the target orbit using the controlled variable of the control target corresponding to the target orbit acquired with the controlled variable acquiring part. At this point, the controlled variable acquiring part acquires the controlled variable of the control target with respect to the target orbit.

According to the above configuration, in the correction device, the learning controller outputs the correction amount of the command value generated from the next target orbit similar to the target orbit using the controlled variable corresponding to the target orbit. Accordingly, the correction device can provide the command value corrected with each of the command value corrector and the learning controller to the feedback control system, so that the following performance about the target orbit can be further improved in the control system including the correction device.

Preferably, the controlled variable acquiring part acquires the current-control-cycle controlled variable of the control target of each of a plurality of feedback control systems, and the command value corrector corrects the current-control-cycle command value received with each of the plurality of feedback control systems using the current-control-cycle controlled variable of the control target of each of the plurality of feedback control systems.

According to the above configuration, in the correction device, the current-control-cycle command value provided to each of the plural feedback control systems is corrected using the current-control-cycle controlled variable. Accordingly, in the correction device, the corrected command value can be provided to each of the plural feedback control systems, so that the following performance about the target orbit can be further improved in the control system including the correction device and each of the plural feedback control systems.

According to another aspect of the present invention, a method for controlling a correction device that corrects a command value, which is generated from a target orbit in each control cycle and is received with a feedback control system that causes a controlled variable of a control target to follow the command value, the correction device controlling method includes: acquiring the controlled variable of the control target in a current control cycle; and correcting the current-control-cycle command value, which is received with the feedback control system, using the current-control-cycle controlled variable acquired in the controlled variable acquiring step.

According to the above configuration, in the correction device controlling method, the current-control-cycle command value provided to the feedback control system is corrected using the current-control-cycle controlled variable. Accordingly, in the method for controlling the correction device, the corrected command value can be provided to the feedback control system, so that the following performance about the target orbit can be further improved in the feedback control system.

In the present invention, the improvement of the following performance about the target value can be achieved in the control system, particularly the feedback control system.

DETAILED DESCRIPTION

First Embodiment

Figure 1:
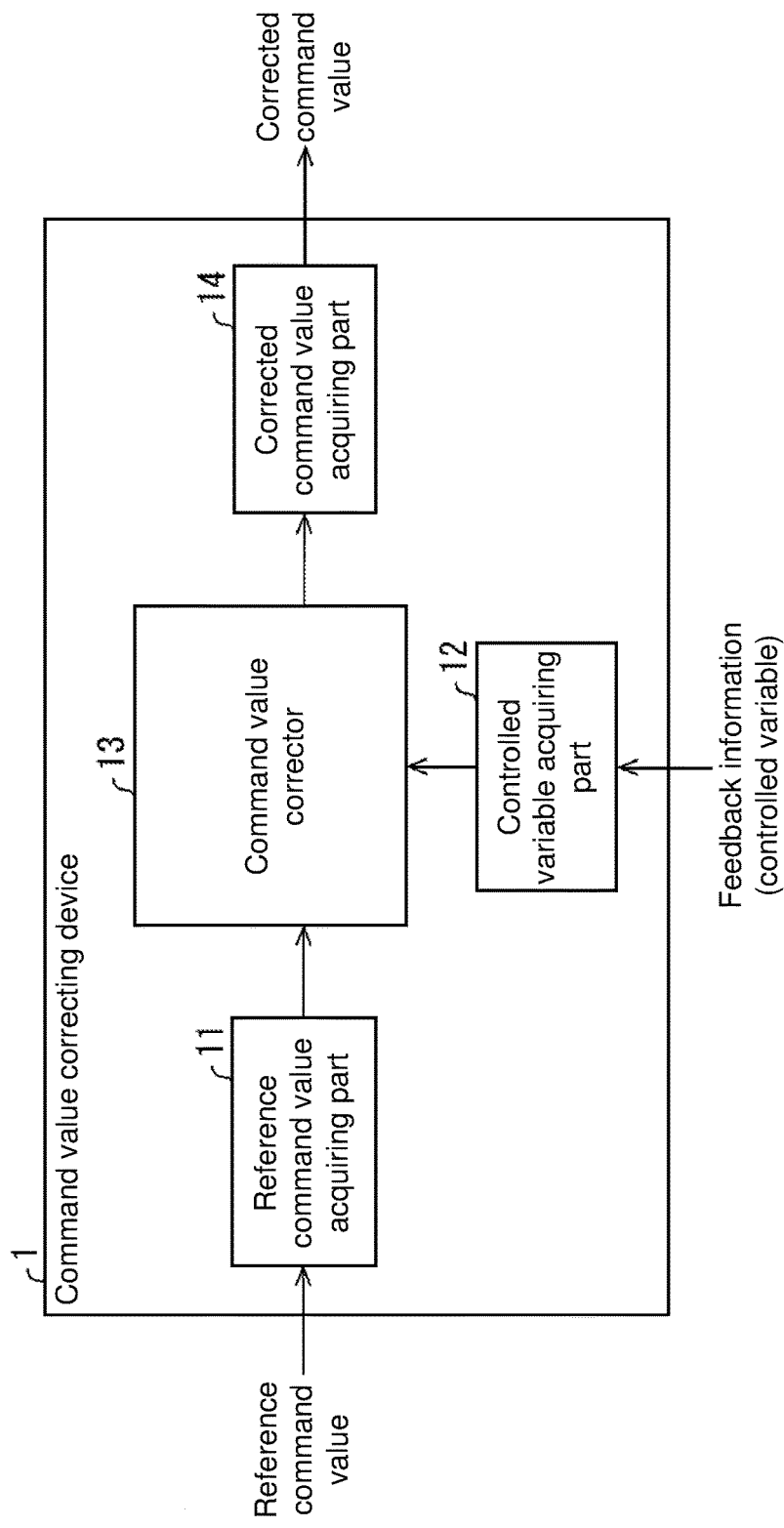
FIG. 1 is a block diagram illustrating a configuration of a main portion of a command value correcting device according to a first embodiment of the present invention.

A first embodiment of the present invention will be described in detail below with reference to FIGS. 1 to 4. In the drawings, the identical or equivalent component is designated by the identical symbol, and the description thereof will not be repeated. To easily understand a command value correcting device 1 (a correction device that corrects a command value received with a feedback control system) of the first embodiment, first an outline of a control system 1000 including the command value correcting device 1 will be described with reference to FIGS. 2A and 2B (particularly, FIG. 2A).

Outline of Control System

Figure 2A:
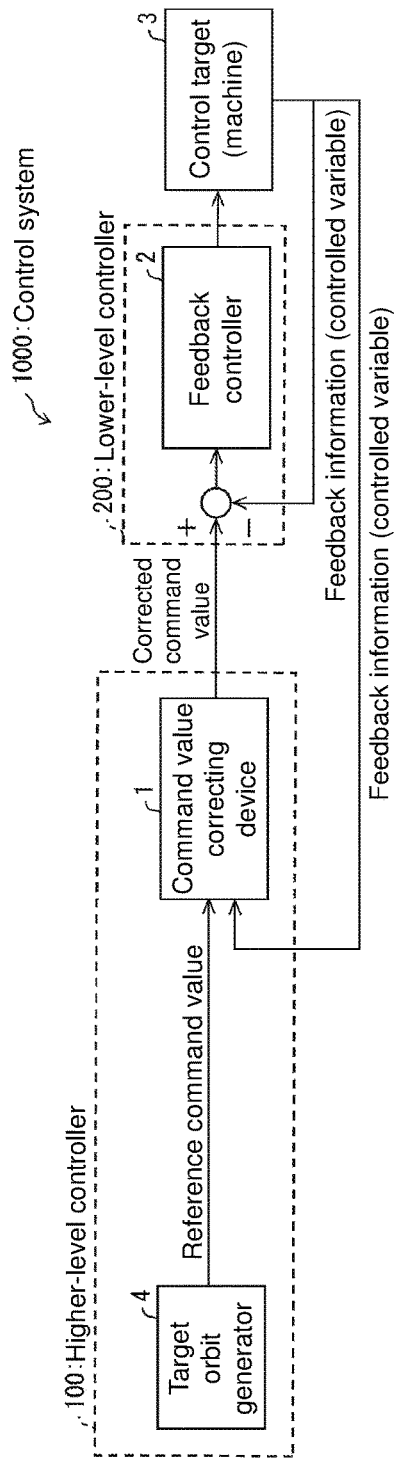
FIGS. 2A and 2B are views illustrating outlines of control systems including the command value correcting device in FIG. 1.
Figure 2B:
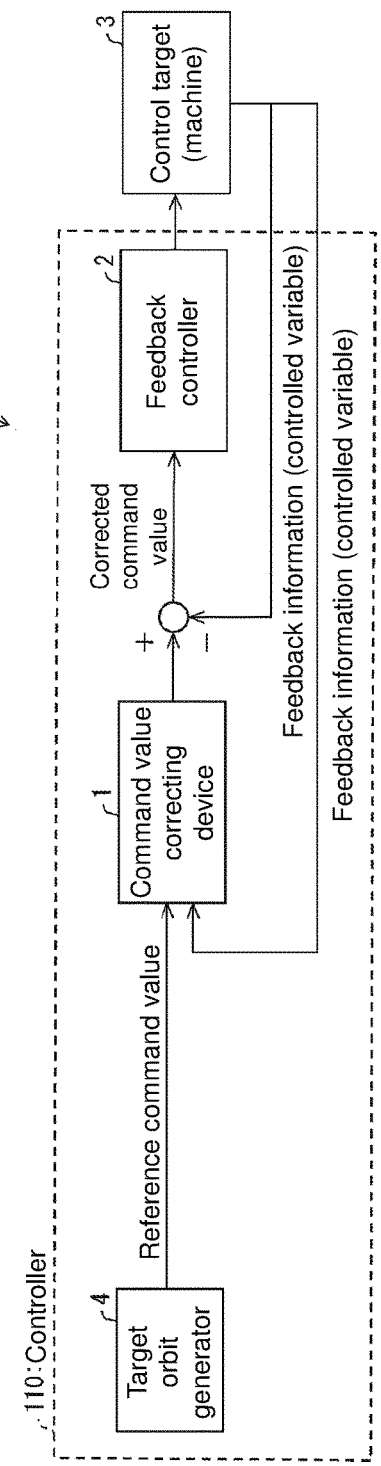

FIGS. 2A and 2B are views illustrating outlines of the control system 1000 including the command value correcting device 1 and a control system 1100 including the command value correcting device 1. FIG. 2A illustrates the outline of the control system 1000. The control system 1000 includes a lower-level controller 200 (for example, a servo driver) including a feedback controller 2, a higher-level controller 100 (for example, a Programmable Logic Controller (PLC)) that provides a command value to the lower-level controller 200, and a control target 3 (a machine such as a servo motor and a machine element driven with the servo motor). In the control system 1000, the command value correcting device 1 is included in the higher-level controller 100.

The higher-level controller 100 transmits the command value (control signal) to the lower-level controller 200 in order to perform drive control (such as "orbit follow-up control" and "orbit control in a working machine") of the control target 3, and controls the lower-level controller 200. The higher-level controller 100 includes a target orbit generator 4 and the command value correcting device 1. The target orbit generator 4 receives a target orbit data (target orbit) from the outside (for example, a user), and generates a reference control command value from the received target orbit data in each control cycle. The command value correcting device 1 corrects the reference control command value generated with the target orbit generator 4 using a controlled variable that is output from the control target 3 as feedback information, and outputs a corrected command value. That is, the higher-level controller 100 transmits the corrected command value to the lower-level controller 200. The corrected command value is a value in which the command value correcting device 1 corrects a reference command value generated from the target orbit data (target orbit) in each control cycle using the controlled variable of the control target 3.

The lower-level controller 200 receives the command value (control signal), particularly the corrected command value, which is corrected with the command value correcting device 1 using the controlled variable of the control target 3, from the higher-level controller 100, and controls the control target 3 based on the received corrected command value. For example, in the case that the control target 3 is a servo motor, the lower-level controller 200 drives the servo motor such that the servo motor rotates at a predetermined rotation velocity by a predetermined amount based on the corrected command value. The lower-level controller 200 includes the feedback controller 2 that performs the feedback control on the control target 3.

The feedback controller 2 controls a manipulated variable provided to the control target 3 such that the controlled variable that is the output of the control target 3 follows the command value (particularly, the corrected command value corrected with the command value correcting device 1) acquired from the higher-level controller 100. The feedback controller 2 acquires the controlled variable of the control target 3 as the feedback information, and controls the manipulated variable based on a difference between the acquired feedback information (the controlled variable of the control target 3) and the command value.

The control target 3 is driven according to the manipulated variable provided from the lower-level controller 200. The controlled variable as the output of the control target 3 is provided to the higher-level controller 100 (particularly, the command value correcting device 1) and the lower-level controller 200 (particularly, the feedback controller 2) as the feedback information.

The lower-level controller 200 is communicably connected to the higher-level controller 100 and the control target 3 in any wired or wireless manner. For example, the higher-level controller 100 and the lower-level controller 200 are connected to each other with any communication cable, and may communicably be connected to each other by, typically EtherIP or EtherCAT (registered trademark). Alternatively, the lower-level controller 200 and the control target 3 (for example, a servo motor) may communicably be connected to each other with a dedicated cable.

The command value correcting device 1 corrects the command value provided to the lower-level controller 200 (particularly, the feedback controller 2) using the feedback information (the controlled variable of the control target 3) used in the lower-level controller 200 (particularly, the feedback controller 2). The command value correcting device 1 corrects the command value provided to the feedback controller 2 using the feedback information used in the feedback controller 2 (feedback control system), thereby achieving following performance about the target orbit with high accuracy.

At this point, two methods are known as a method for correcting the command value provided to the lower-level controller 200 (particularly, the feedback controller 2). First, there is a method for correcting the command value by feedforward control in which information about the command value provided to (received with) the feedback controller 2 and information about a control gain of the feedback controller 2 (lower-level feedback control system) are used. Second, there is a method for correcting the command value in which an inverse function of a total characteristic model of the feedback controller 2 (lower-level feedback control system) and the control target 3 (a machine such as a servo motor and a machine element driven with the servo motor) is used.

In the second method, the following performance can be achieved higher than the first method when the total characteristic model of the feedback controller 2 (lower-level feedback control system) and the control target 3 (machine) has good accuracy. However, in the second method, an influence of a model error of the characteristic model is directly linked to degradation of the following performance. That is, in the second method, sometimes the following performance degrades in the case that the characteristic model has poor accuracy.

On the other hand, the command value correcting device 1, which corrects the command value provided to (received with) the feedback controller 2 (lower-level feedback control system) with the feedback information used in the feedback controller 2 (lower-level feedback control system), has the following unique effect compared with the first and second methods. That is, even if the total characteristic model of the feedback controller 2 (lower-level feedback control system) and the control target 3 (machine) is used, the command value correcting device 1 has the effect that can absorb the influence of the model error of the characteristic model. Accordingly, in the command value correcting device 1, the influence of the model error is relaxed to achieve the high following performance compared with the conventional methods.

In the control system 1000 of FIG. 2A, the controlled variable that is the output of the control target 3 is detected with a controlled variable detecting device (for example, a motor encoder) attached to the control target 3, and is provided from the controlled variable detecting device to the command value correcting device 1 and the feedback controller 2 as the feedback information. Alternatively, the controlled variable of the control target 3 may be detected with an external scale, and provided from the external scale to the command value correcting device 1 and the feedback controller 2 as the feedback information, for example. The feedback controller 2 may use the controlled variable of the control target 3 acquired from the attached controlled variable detecting device (for example, a motor encoder) as the feedback information, and the command value correcting device 1 may use the controlled variable of the control target 3 acquired from the external scale as the feedback information. That is, each of the command value correcting device 1 and the feedback controller 2 may combine the attached controlled variable detecting device and the external scale with the control target 3 as a detection device and an acquisition source of the controlled variable used as the feedback information.

In control systems 1100, 1200, 1300, and 1400 of FIGS. 2B, 3A, 3B, and 4, similarly the controlled variable of the control target 3, which is used as the feedback information with the command value correcting device 1 and the feedback controller 2, may be either the information acquired from the attached controlled variable detecting device (for example, a motor encoder) or the information acquired from the external scale. The feedback controller 2 may use the controlled variable of the control target 3 acquired from the attached controlled variable detecting device as the feedback information, and the command value correcting device 1 may use the controlled variable of the control target 3 acquired from the external scale as the feedback information.

Outline of Command Value Correcting Device

The command value correcting device 1 included in the control system 1000, which has been described with reference to, FIG. 2A, provides the command value (corrected command value), which is corrected with the feedback information (the controlled variable of the control target 3) in order to improve the following performance about the target orbit data with respect to the reference command value (control command value) generated from the target orbit data in each control cycle, to the feedback controller 2. An outline of the command value correcting device 1 will be described below for the purpose of easy understanding of the command value correcting device 1. The command value correcting device 1 (correction device) is a correction device that corrects the command value, which is generated from the target orbit in each control cycle and received with the feedback controller 2 (feedback control system) that causes the controlled variable of the control target 3 to follow the command value. The command value correcting device 1 includes a controlled variable acquiring part 12 that acquires the controlled variable of the control target 3 in the current control cycle and a command value corrector 13 that corrects the current-control-cycle command value received with the feedback controller 2 using the current-control-cycle controlled variable acquired with the controlled variable acquiring part 12.

According to the above configuration, the command value correcting device 1 corrects the current-control-cycle command value provided to the feedback controller 2 using the current-control-cycle controlled variable. Accordingly, the command value correcting device 1 can provide the corrected command value (corrected command value) to the feedback controller 2, so that the following performance about the target orbit can be further improved in the control system (for example, control systems 1000, 1100, 1200, 1300, 1400, and 1500) including the command value correcting device 1, particularly the feedback controller 2.

Detailed Command Value Correcting Device

The command value correcting device 1 of which the outline is described above will be described in detail below with reference to FIG. 1.

FIG. 1 is a block diagram illustrating a configuration of a main portion of the command value correcting device 1 of the first embodiment. As illustrated in FIG. 1, the command value correcting device 1 includes a reference command value acquiring part 11, a controlled variable acquiring part 12, a command value corrector 13, and a corrected command value output part 14.

The reference command value acquiring part 11 acquires the reference control command value generated from target orbit data (target orbit) with the target orbit generator 4 in each control cycle. The controlled variable acquiring part 12 acquires the controlled variable that is the output of the control target 3 as the feedback information. The command value corrector 13 corrects the reference control command value acquired from the target orbit generator 4 with the reference command value acquiring part 11 using the controlled variable acquired with the controlled variable acquiring part 12 as the feedback information. The corrected command value output part 14 outputs (transmits) the command value (corrected command value) corrected with the command value corrector 13 to the lower-level controller 200 (feedback controller 2).

In order to easily understand the command value correcting device 1, command value correcting processing performed with the command value correcting device 1 will be described below using the following example. The following example is described only for the purpose of the easy understanding of the command value correcting device 1. The command value correcting device 1 does not necessary generate plural command values from one target orbit, and control cycles of the plural command values generated from the one target orbit are not necessarily identical to each other. For example, the plural command values having the control cycles of 4 milliseconds to 8 milliseconds may be generated from the one target orbit.

Example of Command Value Correcting Processing

For example, it is assumed that the reference command value acquiring part 11 acquires the command value (reference command value) having the control cycle of 5 milliseconds, which is generated from the target orbit having a cycle of 1 second. That is, the reference command value acquiring part 11 acquires 200 consecutive command values.

The following processing is performed when the corrected command value output part 14 of the command value correcting device 1 outputs an nth (for example, 100th) command value (that is, the command value in an nth control cycle) in the 200 consecutive command values to the lower-level controller 200 (feedback controller 2). That is, the lower-level controller 200 controls the drive of the control target 3 according to the command value in the nth control cycle.

At this point, the controlled variable, which is controlled with the nth corrected command value, of the output of the control target is used to correct an (n+1)th command value as an (n+1)th controlled variable. An nth corrected command value is calculated from the nth reference command value and the nth controlled variable and output, and the nth controlled variable is decided from a state of the control target 3 (machine) driven using an (n−1)th corrected command value (that is, the corrected command value prior to the nth corrected command value).

That is, the controlled variable acquiring part 12 (and the feedback controller 2) of the command value correcting device 1 acquires the controlled variable in the nth control cycle, which is the output of the control target 3 controlled according to the corrected command value prior to the corrected command value in the nth control cycle, as the feedback information in the nth control cycle. Thus, the command value correcting device 1 acquires the controlled variable of the control target 3 in each control cycle, corrects the reference command value based on the acquired controlled variable, and outputs the corrected command value to the feedback controller 2 (lower-level controller 200).

Example of Control System Including Command Value Correcting Device

As illustrated in FIG. 2A, the command value correcting device 1 is included in the higher-level controller 100 different from the lower-level controller 200 including the feedback controller 2. However, the control system including the command value correcting device 1 does not necessarily have the configuration of the control system 1000 in FIG. 2A. The control system except for the control system 1000 will be described below as an example of the control system including the command value correcting device 1 with reference to FIGS. 2B, 3, and 4. In the control system including the command value correcting device 1, the command value correcting device 1 is located superior to the feedback controller 2, and the controlled variable of the control target 3 in which the drive is controlled with the feedback controller 2 may be acquired as the feedback information.

FIG. 2B is a view illustrating an outline of the control system 1100 in which a controller 110 including the command value correcting device 1, the feedback controller 2, and the target orbit generator 4 controls the drive of the control target 3. In the control system 1100, the command value correcting device 1, the feedback controller 2, and the target orbit generator 4 are similar to those of the control system 1000 in FIG. 2A. In the configuration of the control system 1100, one controller (that is, the controller 110) performs all pieces of control processing (that is, the processing of correcting a correction value using the feedback information of the command value correcting device 1 and the feedback processing performed with the feedback controller 2).

Figure 3A:
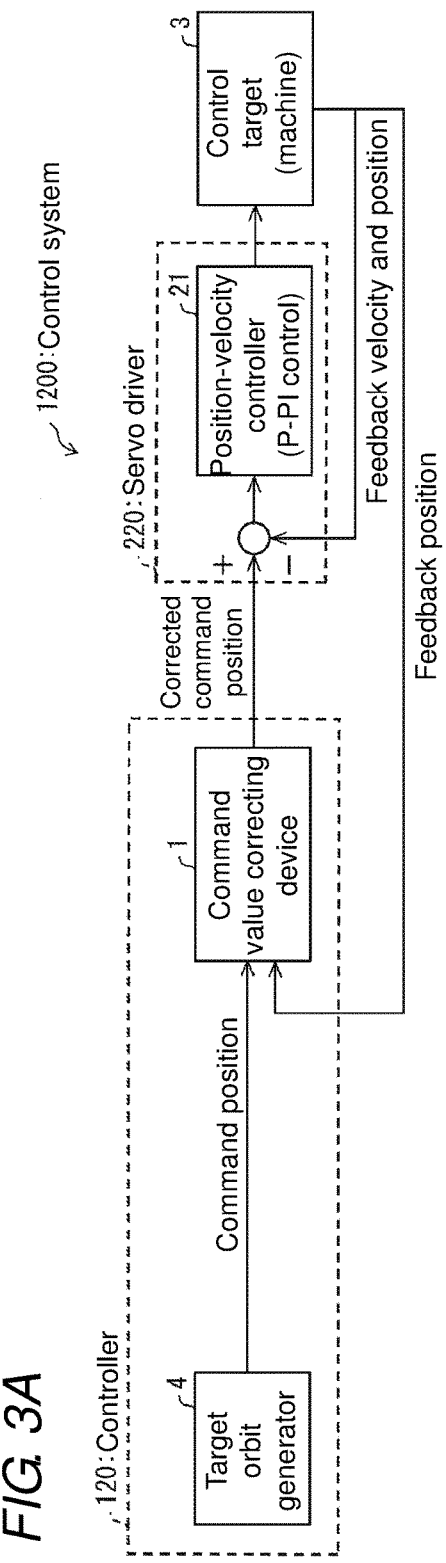
FIGS. 3A and 3B are views illustrating outlines of other control systems including the command value correcting device in FIG. 1.
Figure 3B:
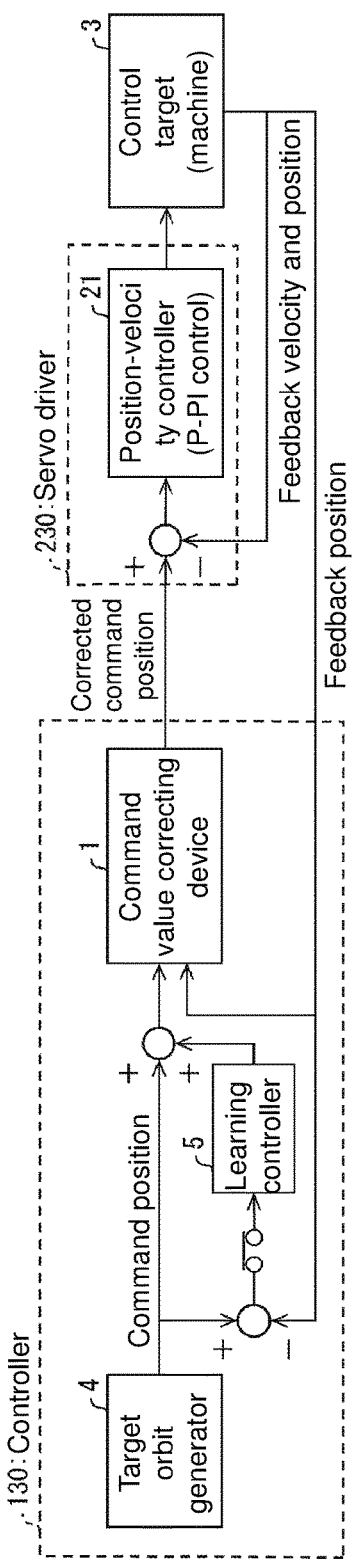

FIGS. 3A and 3B are views illustrating outlines of the control system 1200 including the command value correcting device 1 and the control system 1300 including the command value correcting device 1. Referring to FIG. 3A, the control system 1200 includes a servo driver 220 that is the lower-level controller including a position-velocity controller 21 that is the feedback control system, a controller 120 (for example, a Programmable Logic Controller (PLC)) that is the higher-level controller providing the command value to the servo driver 220, and the control target 3 (a machine such as a servo motor and a machine element driven with the servo motor).

Similarly to the higher-level controller 100, the controller 120 transmits the command value (command position) to the servo driver 220 in order to control the drive of the control target 3, thereby controlling the servo driver 220. The controller 120 includes the target orbit generator 4 and the command value correcting device 1. The target orbit generator 4 and the command value correcting device 1 of the controller 120 are similar to those of the higher-level controller 100. The command value correcting device 1 corrects the command position (reference command position) that is the reference control command value generated with the target orbit generator 4 using the controlled variable (detection position, that is, feedback position) that is the output of the control target 3 as the feedback information, and outputs the corrected command value (corrected command position).

The servo driver 220 receives the command value (command position), particularly the corrected command position, which is corrected with the command value correcting device 1 using the controlled variable of the control target 3, from the controller 120, and controls the control target 3 based on the received corrected command position. The servo driver 220 includes a position-velocity controller 21 that performs the feedback control on the control target 3.

The position-velocity controller 21 is a feedback control system that performs P-PI control, the position-velocity controller 21 controls the manipulated variable provided to the control target 3 such that a detection position (feedback position) that is the controlled variable of the output from the control target 3 follows the corrected command value (corrected command position) acquired from the controller 120 (command value correcting device 1). The position-velocity controller 21 acquires the detection position and a detection velocity of the control target 3 as the feedback information (the feedback position and a feedback velocity). The position-velocity controller 21 controls the manipulated variable based on a difference (deviation) between the acquired feedback position and feedback velocity (the detection position and detection velocity of the control target 3) and the corrected command position.

As described above, in the control system 1200, the feedback control system that receives the corrected command value (corrected command position) corrected with the command value correcting device 1 is the servo driver 220 in which the control target 3 (for example, a servo motor and a machine element driven with the servo motor) is set to the control target.

According to the above configuration, the command value correcting device 1 (correction device) corrects the current-control-cycle command value provided to the servo driver 220 using the current-control-cycle controlled variable. Accordingly, the command value correcting device 1 can provide the corrected command value to the servo driver 220, so that the following performance about the target orbit can be further improved in the control system 1200 including the command value correcting device 1.

FIG. 3B illustrates the outline of the control system 1300. The control system 1300 includes a servo driver 230 including the position-velocity controller 21 that is the feedback control system, a controller 130 (for example, a Programmable Logic Controller (PLC)) that provides the command value to the servo driver 230, and the control target 3 (a machine such as a servo motor and a machine element driven with the servo motor). Because the servo driver 230 of the control system 1300 is similar to the servo driver 220 of the control system 1200, the detailed description is omitted.

The controller 130 further includes a learning controller 5 in addition to the configuration of the controller 120 of the control system 1200. Because the configuration of the controller 130 except for the learning controller 5 is similar to that of the controller 120, the detailed description is omitted.

The learning controller 5 calculates a correction amount about the command value from deviation data calculated based on a preceding control result (feedback information) for the purpose of the next control.

Generally, the controller 130 calculates the deviation data as a difference between the reference command value and the controlled variable that is the feedback information. That is, the controller 130 does not directly acquire the deviation data as the feedback information.

When performing learning a predetermined number of times, the learning controller 5 stops the learning at the predetermined number of times, and then uses the correction amount obtained until the predetermined number of times. That is, as illustrated in FIG. 3B, a switch is provided at a preceding stage of the learning controller 5, and the learning controller 5 does not acquire the preceding control result (feedback information) after the predetermined number of times.

At this point, the learning controller 5 uses the feedback information for the purpose of the next control. However, the learning controller 5 does not use the feedback information in real time.

For example, it is assumed that the reference command value acquiring part 11 acquires the command value (reference command value) having the control cycle of 5 milliseconds, which is generated from the target orbit having a cycle of 1 second. That is, the reference command value acquiring part 11 acquires 200 consecutive command values.

The following processing is performed when the command value correcting device 1 outputs a set of 200 consecutive command values (the target orbit having the cycle of 1 second) to the lower-level controller 200 (feedback controller 2). That is, the lower-level controller 200 controls the drive of the control target 3 according to the set of 200 consecutive command values. The controlled variable acquiring part 12 of the command value correcting device 1 acquires "the controlled variable for one cycle (that is, the controlled variable of the control target 3 corresponding to the target orbit)" that is the output of the control target 3 controlled according to the set of 200 consecutive command values.

The learning controller 5 corrects a set of command values generated from a next target orbit having the same content as the target orbit using "the controlled variable for one cycle (that is, corresponding to the 200 consecutive command values)" corresponding to the target orbit acquired with the controlled variable acquiring part 12. That is, the learning controller 5 corrects the set of command values (for one cycle, namely, the set of 200 consecutive command values) generated with respect to the next target orbit having the same content as "the current target orbit" using the whole controlled variable of the control target 3 (the controlled variable for one cycle) corresponding to the whole of "the current target orbit".

For example, the learning controller 5 collectively calculates the 200 correction amounts before the control is started. However, the controller 130 that is the higher-level controller does not necessarily collectively transfer the set of 200 pieces of data to the lower-level controller 200. The controller 130 that is the higher-level controller does not necessarily collectively acquire the 200 controlled variables. Generally, similarly to the case that the learning controller 5 is not included, the controller 130 that is the higher-level controller outputs the corrected command value in each control cycle of the controller 130 (that is, takes out the correction amount one by one from the previously-calculated 200 correction amounts, and outputs the correction amount while adding the correction amount to the reference command value), and acquires the controlled variable (that is, the 200 correction amounts are stored to calculate the correction amounts for the next time).

For example, it is assumed that the learning controller 5 in FIG. 3B does not correct the command value, but calculates the correction amount used to correct the command value. A correction amount adder (not illustrated) and the like use the correction amount calculated with the learning controller 5 in order to correct the command value of the command value correcting device 1.

In the controller 130 (command value correcting device 1) of the control system 1300, the controlled variable acquiring part 12 further acquires the controlled variable of the control target 3 corresponding to the target orbit, the controller 130 (command value correcting device 1) further includes the learning controller 5 that outputs the correction amount of the command value generated in each control cycle from the next target orbit similar to the target orbit using the controlled variable of the control target 3 corresponding to the target orbit acquired with the controlled variable acquiring part 12.

According to the above configuration, in the controller 130 (command value correcting device 1), the learning controller 5 outputs the correction amount of the command value generated from the next target orbit similar to the target orbit using the controlled variable corresponding to the target orbit. Accordingly, the controller 130 (command value correcting device 1) provides the command value corrected with each of the command value corrector 13 and the learning controller 5 to the feedback controller 2, so that the following performance about the target orbit can be further improved in the control system 1300 including the command value correcting device 1.

Figure 4:
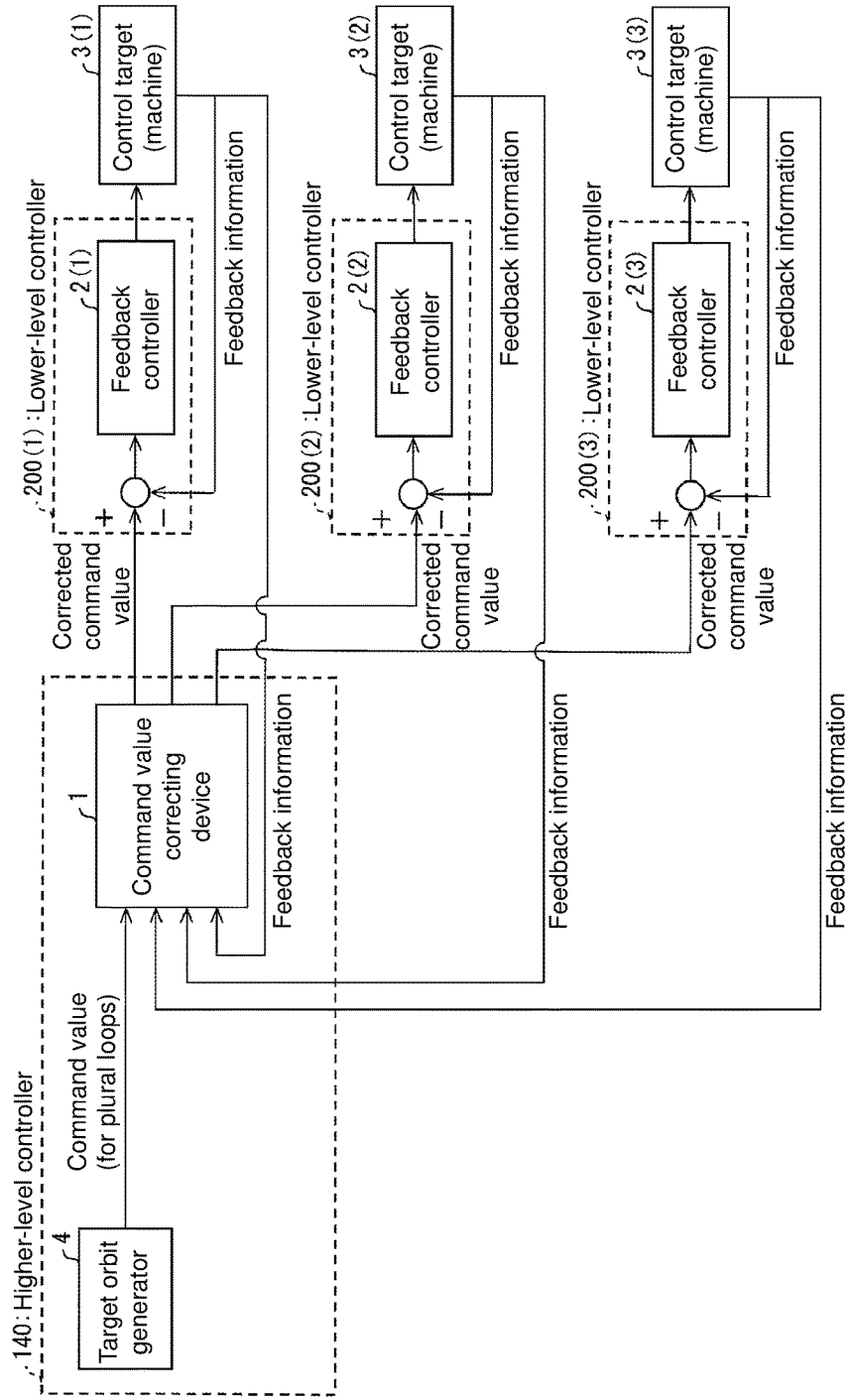
FIG. 4 is a view illustrating an outline of another control system including the command value correcting device in FIG. 1.

FIG. 4 is a view illustrating an outline of the control system 1400 including the command value correcting device 1. The control system 1400 includes a higher-level controller 140 having a configuration similar to the higher-level controller 100 of the control system 1000, plural lower-level controllers 200(1) to 200(n), and plural control targets 3(1) to 3(n) in which the drive is controlled with each of the lower-level controllers 200(1) to 200(n). FIG. 4 illustrates an example for the case of "n=3". Each of the lower-level controllers 200(1) to 200(n) has the configuration similar to the lower-level controller 200 of the control system 1000, and each of the control targets 3(1) to 3(n) has the configuration similar to the control target 3 of the control system 1000. Therefore, the detailed description is omitted.

In the control system 1400 of FIG. 4, the controlled variable acquiring part 12 of the higher-level controller 140 acquires the current-control-cycle controlled variables of the control targets 3(1) to 3(n) that are the control targets of the plural lower-level controllers 200(1) to 200(n) (that is, plural feedback control systems), and the command value corrector 13 corrects the current-control-cycle command values received with the plural lower-level controllers 200(1) to 200(n) using the current-control-cycle controlled variables of the control targets 3(1) to 3(n).

According to the above configuration, the command value correcting device 1 corrects the current-control-cycle command values provided to the plural lower-level controllers 200(1) to 200(n) using the current-control-cycle controlled variables of the control targets 3(1) to 3(n). Accordingly, the command value correcting device 1 can provide the corrected command values to the plural lower-level controllers 200(1) to 200(n), so that the following performance about the target orbit can be further improved in the control system 1400 including the command value correcting device 1 and the plural lower-level controllers 200(1) to 200(n).

The controlled variable of the control target 3(k) is not necessarily used only in the correction of a kth-loop command value. In the case that the interference exists between the plural control loops (for example, in the case that the interference exists between the kth loop and a (k+1)th loop), the command value correcting device 1 uses the controlled variable of the control target 3(k) in the correction of another loop (for example, the (k+1)th loop), which allows the further improvement of the correction effect. Processing performed with the command value correcting device of one aspect of the present invention The processing performed with the command value correcting device 1 having the configuration described in detail above can be summarized as follows. The control method performed with the command value correcting device 1 (correction device) is a control method performed with the correction device that corrects the command value, which is generated from the target orbit in each control cycle and received with the feedback control system (the feedback controller 2 and the position-velocity controller 21) that causes the controlled variable of the control target 3 to follow the command value. The control method includes a controlled variable acquiring step of acquiring the controlled variable of the control target 3 in the current control cycle and a command value correcting step of correcting the current-control-cycle command value received with the feedback control system using the current-control-cycle controlled variable acquired in the controlled variable acquiring step.

According to the above configuration, in the method for controlling the command value correcting device 1, the current-control-cycle command value provided to the feedback control system is corrected using the current-control-cycle controlled variable. Accordingly, in the method for controlling the command value correcting device 1, the corrected command value can be provided to the feedback control system, so that the following performance about the target orbit can be further improved in the feedback control system.

Supplement to Processing Performed with Command Value Correcting Device

Generally, the control cycle of the higher-level controller (for example, the higher-level controller 100, the controller 120, the controller 130, and the higher-level controller 140, particularly the command value correcting device 1) is longer than that of the lower-level controller (for example, the lower-level controller 200, the servo driver 220, the servo driver 230, and the plural lower-level controllers 200(1) to 200(n)). Additionally, because communication is added into the control loop of the higher-level controller, the control operation of the higher-level controller is relatively delayed compared with the control operation of the lower-level controller.

Specifically, the control cycle (indicating a time interval of a command value calculating cycle) of the command value correcting device 1 is longer than that of the lower-level controller (that is, the feedback controller 2 and the position-velocity controller 21). The control operation of the command value correcting device 1 is relatively delayed compared with the control operation of the lower-level controller.

Accordingly, desirably the control method (command value correcting method) performed with the command value correcting device 1 includes a prediction mechanism like Model Predictive Control (MPC). In a later-described second embodiment of the present invention, the control method including the prediction mechanism like the MPC is described as the control method (command value correcting method) performed with the command value correcting device according to an aspect of the present invention.

The control method performed with the command value correcting device 1 is not limited to the control method including the prediction mechanism. Other control methods such as state feedback control and an internal model control may be adopted as the control method performed with the command value correcting device 1.

As to the control method performed with the command value correcting device 1, a method for correcting the command value of the lower-level feedback control using model-based control (such as the MPC) has an advantage over a method for directly calculating the manipulated variable using the model-based control in the following point.

That is, in the model-based control, because a calculation load is larger than that of the PID control, there is a trade-off relationship with speed enhancement of the control cycle. At this point, when the control cycle becomes lower speed, there is a demerit that a response is delayed.

On the other hand, the model-based feedback control in the low-speed control cycle is provided in the higher level while the feedback control loop in the high-speed control cycle is maintained as the lower-level configuration by the conventional simple control method (such as the PID control), and the model-based feedback control in the low-speed control cycle is used to correct the command value received in the lower-level feedback control loop, whereby the control accuracy is ensured. This combination is effective. Specifically, while the control loop of the feedback controller 2 and the position-velocity controller 21, which is the conventional, simple feedback control system having the high-speed control cycle is maintained, the command value correcting device 1 that performs the model-based feedback control in the low-speed control cycle is disposed superior to the feedback controller 2 and the position-velocity controller 21. In the command value correcting device 1, the command value received with the feedback controller 2 and the position-velocity controller 21 is corrected by the model-based feedback control in the low-speed control cycle. Therefore, followability about the target orbit is improved to ensure the control accuracy.

Second Embodiment

A second embodiment of the present invention will be described below with reference to FIGS. 5 to 10. For simplicity of description, only a configuration (a processing procedure and a processing content) different from that of the first embodiment will be described below. That is, the configuration described in the first embodiment is included in the configuration of the second embodiment. The term defined in the first embodiment is identical to that of the second embodiment.

To easily understand a command value correcting device 7 (a correction device that corrects the command value received with the feedback control system) of the second embodiment, first an outline of a control system 1500 including the command value correcting device 7 will be described with reference to FIG. 6.

Figure 6:
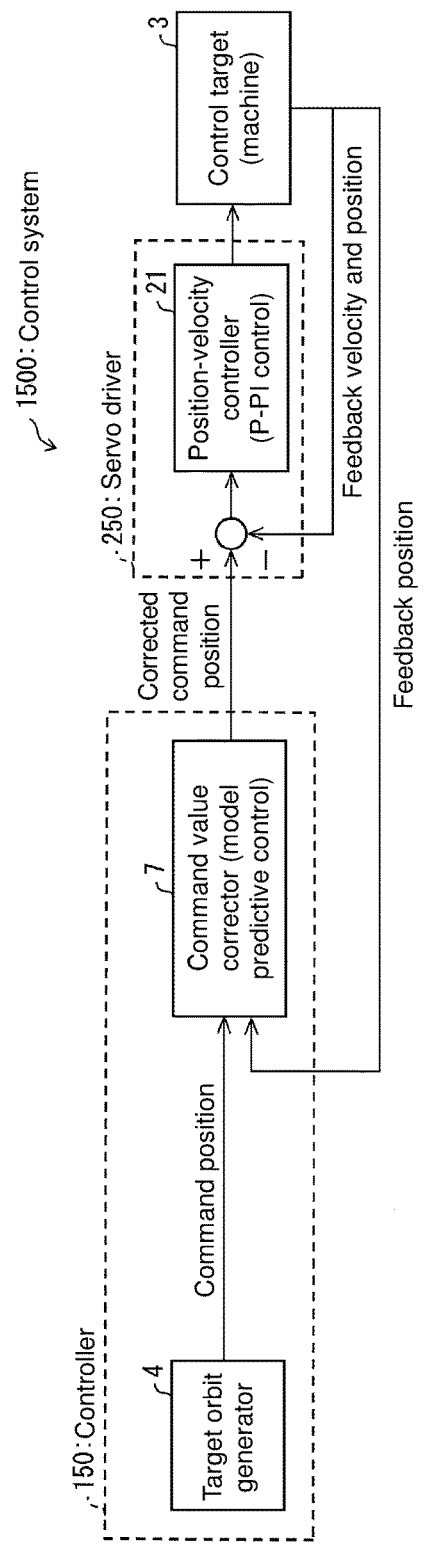
FIG. 6 is a view illustrating an outline of a control system including the command value correction device in FIG. 5.

FIG. 6 is a view illustrating an outline of the control system 1500 including the command value correcting device 7. The control system 1500 in FIG. 6 is substantially identical to the control system 1200 in FIG. 3A. The control system 1500 includes a servo driver 250 that is the lower-level controller including the position-velocity controller 21 that is the feedback control system, a controller 150 (for example, a Programmable Logic Controller (PLC)) that is the higher-level controller providing the command value to the servo driver 250, and the control target 3 (a machine such as a servo motor and a machine element driven with the servo motor). Because the servo driver 250 and the control target 3 of the control system 1500 are similar to the servo driver 220 and the control target 3 of the control system 1200, the detailed description is omitted.

The controller 150 includes the target orbit generator 4 similarly to the controller 120 of the control system 1200, and includes the command value correcting device 7 instead of the command value correcting device 1 of the controller 120.

Outline of Command Value Correcting Device of the Second Embodiment

An outline of the command value correcting device 7 (correction device) of the second embodiment will be described below. The command value corrector 13 of the command value correcting device 7 corrects the command value in the current control cycle using the controlled variable in the current control cycle by the MPC in which models of the feedback controller 2 and the control target 3 are used.

According to the above configuration, the command value corrector 13 of the command value correcting device 7 corrects the command value in the current control cycle using the controlled variable in the current control cycle, and the MPC in which the models of the servo driver 250 that is the feedback control system and the control target 3 are used. Accordingly, the command value correcting device 7 can correct the command value in the current control cycle using the model by the MPC. Resultantly, an influence of the delay caused by a feedback control loop provided in the higher-level controller can be suppressed by the model predictive control to improve the following performance.

The command value corrector 13 corrects the command value in the current control cycle using the current-control-cycle controlled variable as the input by the MPC in which the models of the feedback control system (servo driver 250) and the control target 3 are used. Accordingly, the command value correcting device 7 (correction device) can correct the command value in the current control cycle using the model by the model predictive control. Therefore, an adverse effect on the control stability, which is caused by the construction of the control loop of the command value corrector 13 having a relatively larger delay compared with the control loop of the feedback control system, can be reduced.

Detailed Command Value Correcting Device

The command value correcting device 7 of which the outline is described above will be described in detail below with reference to FIG. 5.

Figure 5:
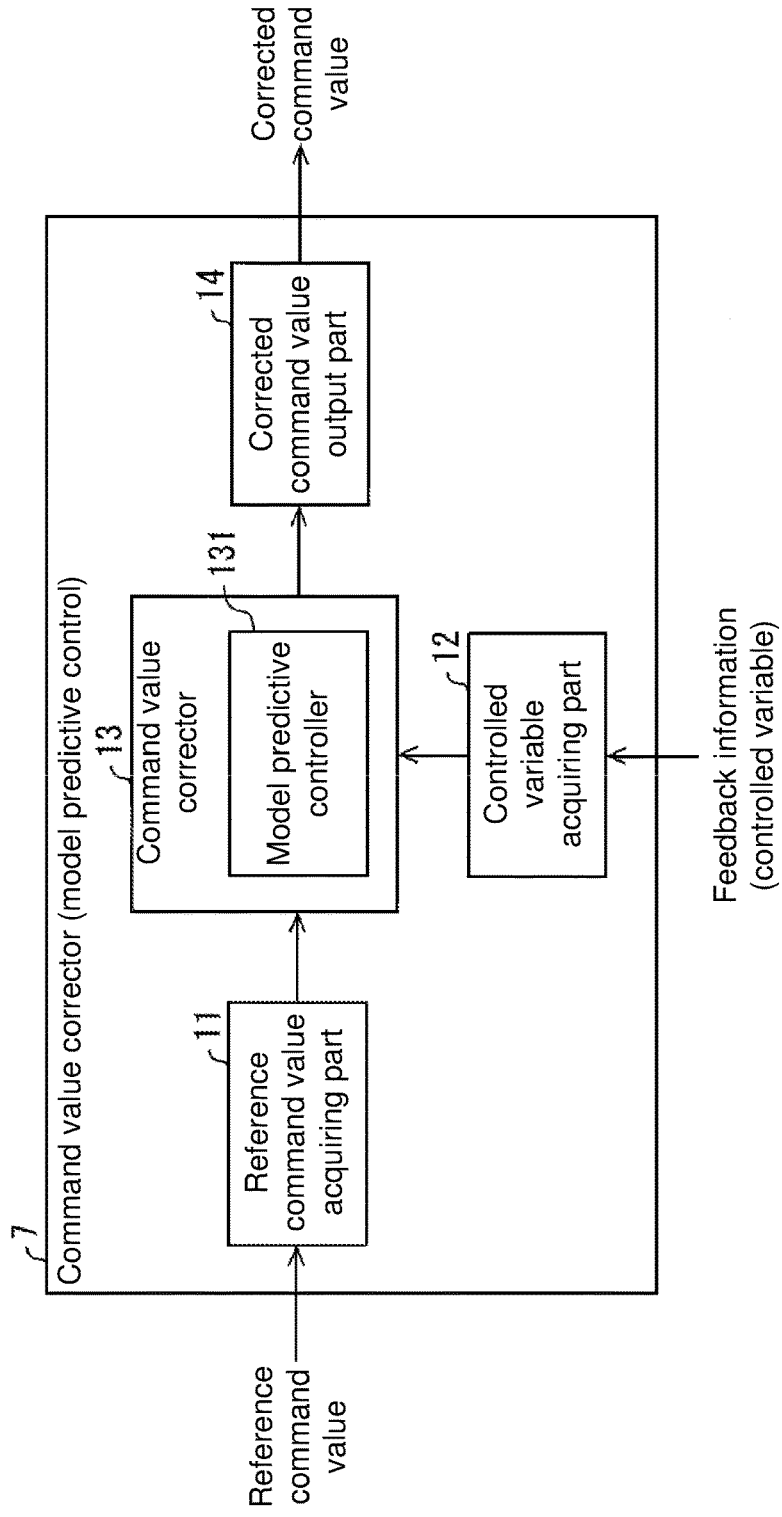
FIG. 5 is a block diagram illustrating a configuration of a main portion of a command value correcting device according to a second embodiment of the present invention.

FIG. 5 is a block diagram illustrating a configuration of a main portion of the command value correcting device 7. As illustrated in FIG. 5, the command value correcting device 7 includes a reference command value acquiring part 11, a controlled variable acquiring part 12, a command value corrector 13, and a corrected command value output part 14 similarly to the command value correcting device 1, and the command value corrector 13 includes a model predictive controller 131. The model predictive controller 131 corrects (controls) the current-control-cycle command value received with the feedback controller 2 using the current-control-cycle controlled variable of the control target 3 as the feedback information by the MPC.

In the MPC, a change in future output, namely, a change in output (=controlled variable) of the control target 3 is predicted based on an internal model of the control target, and the input is decided such that the output and the target value come close to each other as much as possible. That is, in the MPC, a future state is predicted using the internal model in which a behavior of the control target is modeled, and the manipulated variable is decided so as to come close to the target value as much as possible. The detailed processing performed with the model predictive controller 131 will be described below with reference to FIGS. 7 to 10.

Detailed Model Predictive Control

Figure 7:
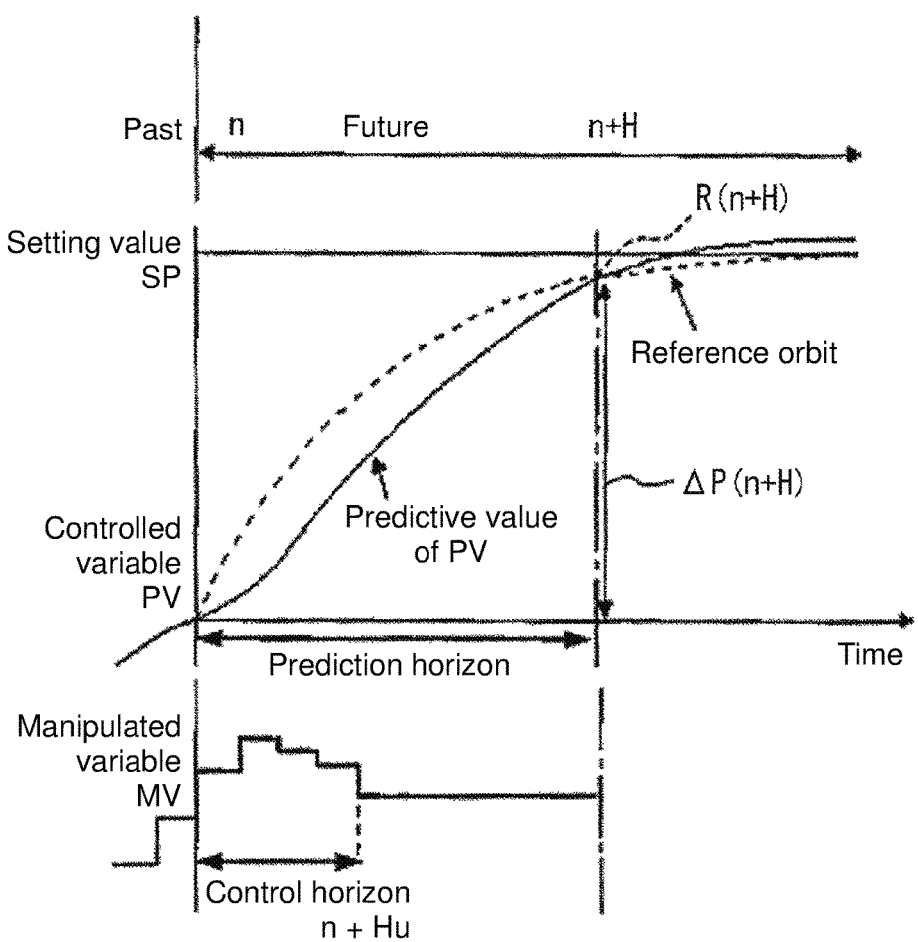
FIG. 7 is a view illustrating a basic concept of an algorithm of model predictive control.

FIG. 7 is a view illustrating a basic concept of an algorithm of the model predictive control.

The model predictive controller 131 uses a total characteristic model (internal) of the servo driver 250 (lower-level feedback controller) and the control target 3 (a machine such as a servo motor and a machine element driven with the servo motor). At this point, "the total characteristic of the servo driver 250 and the control target 3" used in the model predictive controller 131 can be represented by the following discrete time transfer function.

$$y = z^{-d} \frac{b_1 z^{-1} + b_2 z^{-2} + \ldots + b_m z^{-M}}{1 + a_1 z^{-1} + a_2 z^{-2} + \ldots + a_n z^{-N}} u \quad (1)$$

Where
u: input
y: output (predictive value)
d, $a_1$-$a_N$, $b_1$-$b_M$: characteristic parameter The above model is also called a pulse transfer function.

As illustrated in FIG. 7, the model predictive controller 131 measures a controlled variable PV(n) at a current clock time n, and calculates a reference orbit indicated by a broken line that gradually comes close to a setting value SP with the controlled variable PV(n) at the current clock time n as a starting point. For convenience, a control horizon Hu is set to 1.

Then, a manipulated variable MV(n) at the current clock time n is decided using the internal model such that a predictive value PV(n+H) of a controlled variable PV after a prediction horizon H is matched with the reference orbit.

The obtained manipulated variable MV(n) is actually added to the feedback control system (in the second embodiment, the servo driver 250) of the lower-level controller, and the manipulated variable MV(n) is held until a next control cycle (sampling clock time) n+1.

When the controlled variable PV(n+1) is measured at the clock time n+1, the clock time n+1 is regarded as the current clock time, and the manipulated variable is decided such that a future predictive value and the reference orbit are matched with each other after the prediction horizon H, and the manipulated variable is added to the feedback control system (in the second embodiment, the servo driver 250) of the lower-level controller until the next control cycle (sampling clock time). Then, the procedure is repeated.

The projective control of the model predictive controller 131 of the second embodiment will be described in detail below.

As described above, the model predictive controller 131 performs the projective control using the internal model. In the second embodiment, the internal model is an N-order ARX model represented by the following equation discretized by the control cycle (sampling time). The model of the control target is not necessarily the ARX model, but a step response model and other models may be used as the model of the control target.

$$Y(n) = -a_1 * Y(n-1) - a_2 * Y(n-2) - \ldots - a_N * Y(n-N) + b_1 * U(n-1) + b_2 * U(n-2) + \ldots + b_M * U(n-M) \quad (2)$$

Where
Y(n): internal model output value at clock time n
U(n): manipulated variable at clock time n
$a_1$ to $a_N$, $b_1$ to $b_M$: coefficients of internal model
N, M: degree of internal model A dead time can also be included in the above model. However, in the second embodiment, the dead time is separated from the internal model, and separately dealt with as described later.

For example, time-series data input to and output from the feedback control system (in the second embodiment, the servo driver 250) and the control target 3 of the lower-level controller, namely, the pieces of time-series data of the manipulated variable MV and the controlled variable PV is previously measured, and the ARX model is decided by a least square method and the like.

In the second embodiment, an orbit in which a deviation at the current clock time n is exponentially brought close to zero with a time constant Tr is used as the reference orbit indicated by a broken line in FIG. 7.

That is, a target value R(n+H) in the reference orbit after the prediction horizon H can be obtained by the following equation.

$$R(n+H) = SP(n+H) - \lambda^H * \{SP(n) - PV(n)\},$$

$$\lambda = \exp(-Tc/Tr)$$

Where
PV(n): controlled variable at clock time n
SP(n), SP(n+H): target value at clock times n, n+H
R(n+H): target value in reference orbit of prediction horizon H
Tc: control cycle (sampling time)

Accordingly, an increment from the controlled variable PV(n) at the current clock time n, namely, an increment (deviation) ΔP(n+H) necessary to match the controlled variable PV with the target value R(n+H) in the reference orbit after the prediction horizon H is represented as follows.

$$\Delta P(n+H) = SP(n+H) - \lambda^H * \{SP(n) - PV(n)\} - PV(n) =$$
$$(1 - \lambda^H)\{SP(n) - PV(n)\} + SP(n+H) - SP(n)$$

The calculation of the manipulated variable MV will be described below.

For a linear control target, the behavior of the model output can be obtained by the following two pieces of addition.

(1) Free Response

In the case that zero is maintained as a future manipulated variable MV while a current state is set to an initial value, a model output Yf(n+H) after the prediction horizon H is obtained from the equation of the ARX model by a repetitive calculation.

$$Yf(n+1) = -a_1^* Y(n) - a_2^* Y(n-1) - \ldots - a_N^* Y(n-N+1) \quad (3)$$

$$Yf(n+2) = -a_1^* Yf(n+1) - a_2^* Y(n) - \ldots - a_N^* Y(n-N+2)$$

$$\ldots$$

$$Yf(n+H) = -a_1^* Yf(n+H-1) - a_2^* Yf(n+H-2) - \ldots - a_N^* Y(n-N+H)$$

(2) Step Response

A model output S(H) at a clock time H is obtained in the step response of MV=1 (100%) while the initial state is set to zero.

$$S(1) = b_1 \quad (4)$$

$$S(2) = -a_1^* S(1) + (b_1 + b_2)$$

$$\ldots$$

$$S(H) = -a_1^* S(H-1) - a_2^* S(H-2) - \ldots - a_N^* S(H-N) + (b_1 + b_2 + \ldots + b_M)$$

A step response output at the clock time H becomes MV(n)*S(H) when the step response is generally set to MV(n) instead of MV=1 (100%).

Where

MV(n): manipulated variable at clock time n

Yf(n+H): free response output of model after prediction horizon H

S(H): step response output of model at clock time H

In the case that the manipulated variable MV(n) is continued after the clock time n, from the preceding paragraph, the model output (the predictive value of the controlled variable) at a clock time n+H is represented as follows.

$$Y(n+H)=Yf(n+H)+MV(n)*S(H)$$

An increment from Y(n), namely, an increment ΔM(n+H) of the model output expected after the prediction horizon H is represented as follows.

$$\Delta M(n+H)=Yf(n+H)+MV(n)*S(H)-Y(n)$$

The manipulated variable MV is obtained such that the increment ΔM(n+H) of the model output expected after the prediction horizon H is equal to the increment ΔP(n+H) of the controlled variable PV that is set to the target value in the reference orbit.

That is, the manipulated variable MV of ΔM(n+H)=ΔP(n+H) is obtained.

The following equation is obtained from ΔM(n+H)=ΔP(n+H).

$$Yf(n+H)+MV(n)*S(H)-Y(n)=(1-\lambda^H)\{SP(n)-PV(n)\}+SP(n+H)-SP(n)$$

The following equation is obtained when the above equation is solved with respect to MV(n).

$$MV(n)=[(1-\lambda^H)\{SP(n)-PV(n)\}+SP(n+H)-SP(n)-Yf(n+H)+Y(n)]/S(H)$$

In the second embodiment, because the dead time is not included in the internal model as described above, it is necessary to modify the above calculation equation for MV into a calculation equation in which a dead time d is considered.

Therefore, in the second embodiment, data at a clock time n+d is used instead of the clock time n with respect to the actual process data.

$$MV(n)=[(1-\lambda^H)\{SP(n+d)-PV(n+d)\}+SP(n+H+d)-SP(n+d)-Yf(n+H)+Y(n)]/S(H)$$

At this point, the predictive value of PV(n+d) is required, and usually obtained as rational approximation by the following equation.

$$PV(n+d)=PV(n)+Y(n)-Y(n-d)$$

After the manipulated variable MV(n) at the clock time n is calculated, the following model output Y(n+1) is obtained for the purpose of the next calculation.

$$Y(n+1)=-a_1*Y(n)-a_2*Y(n-1)-\ldots-a_N*Y(n-N+1)+b_1*MV(n)+b_2*MV(n-1)+\ldots+b_M*MV(n-M+1) \quad (5)$$

At this point, a value after the manipulated variable limiting processing is used as MV(n).

In the above control algorithm, it is assumed that the target value (=command value) is changed in the stepwise manner for the sake of easy understanding of the model predictive control and for the simple description. The comparison of the following performance described later with reference to FIGS. 8 to 10 also includes a ramp-shape change of the command value, and is a control result in the use of the control algorithm in which the model predictive controller 131 can also be dealt with the ramp-shape change. In order to improve followability, the model predictive controller 131 does not use the reference orbit (means the reference orbit time constant Tr=0).

Example of Model Predictive Control

Figure 8:
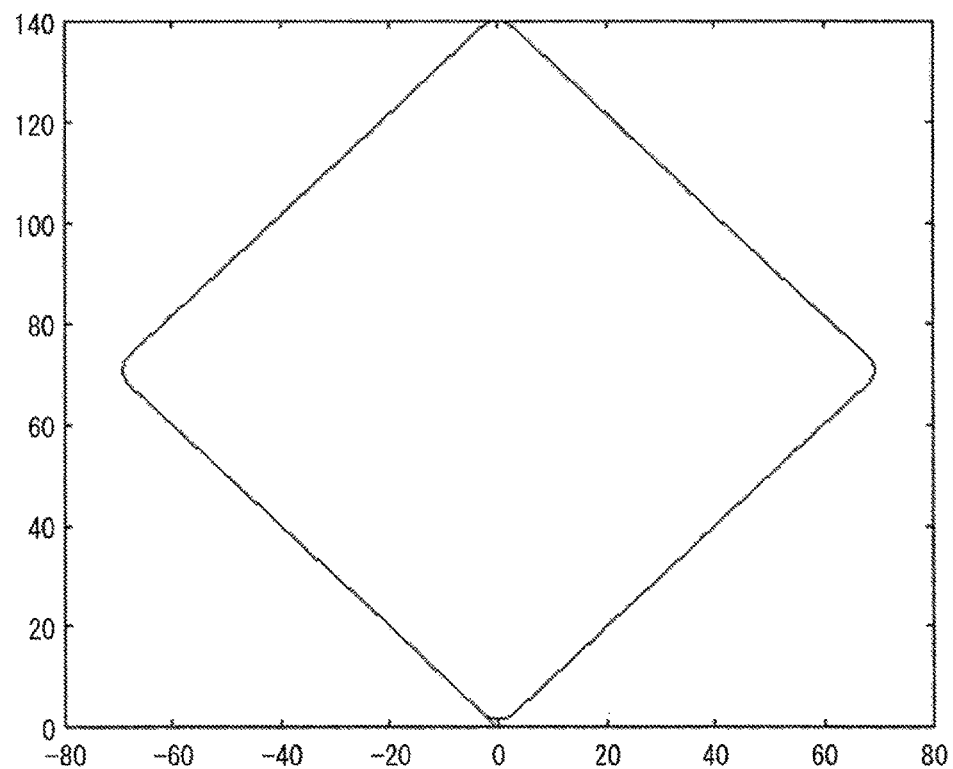
FIG. 8 is a view illustrating an example of an orbit that is a basis of a command value corrected with the command value correcting device in FIG. 5.
Figure 9:
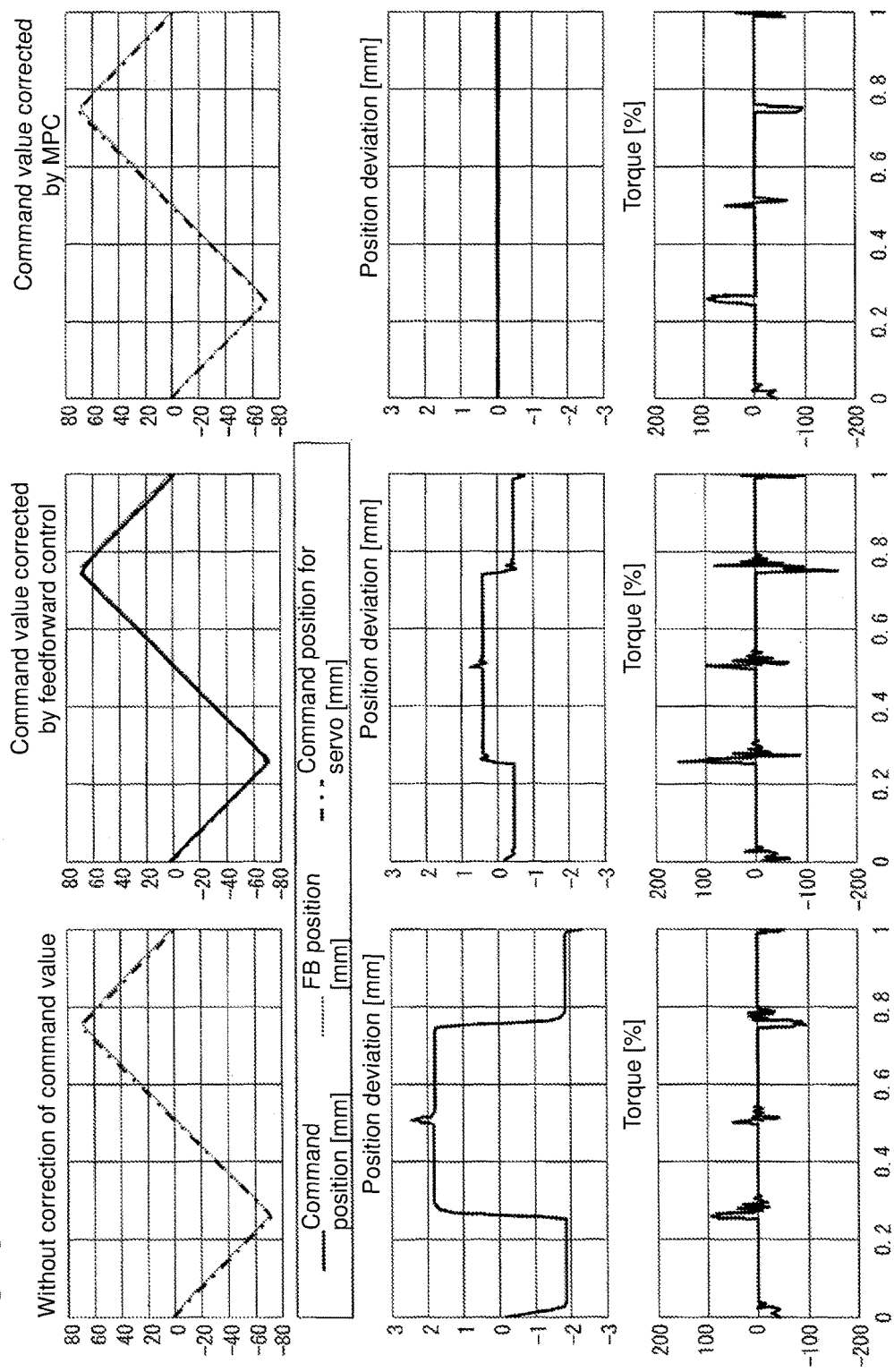
FIG. 9 is a view illustrating loci of a command value, a position deviation, and a torque with respect to a command value corrected with the command value correcting device in FIG. 5, a command value corrected by feedforward control, and a command value in which correction is not performed, which is configured by 2-axis perpendicular to each other.
Figure 10:
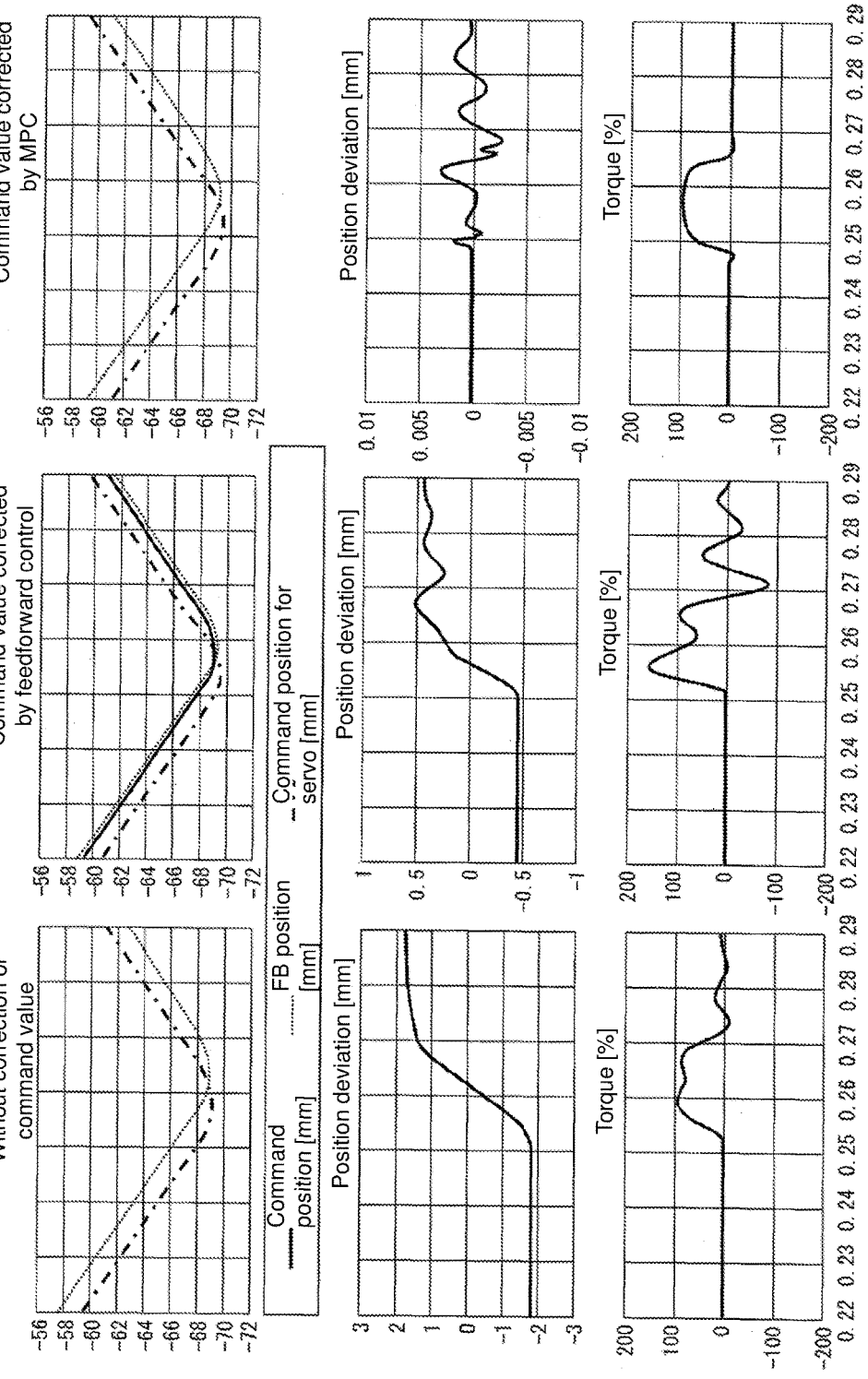
FIG. 10 is an enlarged view illustrating the loci in FIG. 9.

The effect of the model predictive controller 131 that performs the model predictive control will be described with reference to FIGS. 8 to 10. In the examples of FIGS. 8 to 10, a quartic transfer function model is used as a model (a model indicating a total characteristic of the servo driver 250 and the control target 3) used in the model predictive controller 131. Generally, the effect of the command value corrected with the model predictive controller 131 (the improvement of the following performance) depends on the accuracy of the model used in the model predictive controller 131, and the accuracy is enhanced up to a certain degree of the model.

FIG. 8 is a view illustrating an example of the target orbit that is a basis of a command value corrected with the command value correcting device 7. The following performance of the command value correcting device 7 is compared to the following performance of the conventional technology (the case that the command value is corrected by the feedforward control and the case that the command value is not corrected) with respect to X-axis control in the case that the follow-up control is performed on a rhombus orbit (target orbit) as illustrated in an XY-table of FIG. 8. The target orbit in FIG. 8 is an orbit that clockwise makes one rotation from a coordinate (0, 0), and is an orbit constructed with a combination of a straight line and an arc.

FIG. 9 is a view illustrating loci of a position deviation and a torque with respect to the command value corrected with the command value correcting device 7, the command value corrected by the feedforward control, and the command value in which the correction is not performed. In FIG. 9, a solid line indicates the command position, namely, the reference command position that is the reference command value. A dotted line indicates a FB position (feedback position). An alternate long and short dash line indicates the command position to the servo, namely, the command position provided to the servo driver 250. FIG. 9 illustrates, from the left, measured various loci in the case that the command of the correction value is not issued, the case that the command value is corrected by the feedforward control, and the case that the command value correcting device 7 corrects the command value. The measured various loci indicate, from the top side, the command position (reference command position, the FB position, and the command position to the servo), the position deviation, and the torque.

As illustrated in FIG. 9, the position deviation separates largely from "0" in the case that the command of the correction value is not issued, and the separation of the position deviation from "0" decreases in the case that the command value is corrected by the feedforward control. The position deviation becomes "0" in the case that the command value correcting device 7 corrects the command value.

With respect to the torque in FIG. 9, a variation in the case that the command value is corrected by the feedforward control is larger than that in the case that the command of the correction value is not issued. The torque variation in the case that the command value correcting device 7 corrects the command value is similar to that in the case that the command of the correction value is not issued.

In FIG. 9, the torque is increased in timing of changing the command value from the fall to the rise. As illustrated in FIG. 9, the timing of increasing the torque becomes quicker in the order of the case that the command of the correction value is not issued, the case that the command value is corrected by the feedforward control, and the case that the command value correcting device 7 corrects the command value. This corresponds to the quicker timing of changing the corrected command value from the fall to the rise. That is, since the command value correcting device 7 includes the model predictive controller 131 that is the prediction mechanism, the command value correcting device 7 can properly decide the timing of changing the corrected command value from the fall to the rise, thereby being able to properly decide the timing of increasing the torque.

FIG. 10 is an enlarged view illustrating the loci in FIG. 9. As to the position deviation illustrated in FIG. 10, the separation of the position deviation from "0" becomes smaller in the order of the case that the command of the correction value is not issued, the case that the command value is corrected by the feedforward control, and the case that the command value correcting device 7 corrects the command value. In FIG. 10, the torque variation in the case that the command value is corrected by the feedforward control is larger to that in the case that the command of the correction value is not issued, and the torque variation in the case that the command value correcting device 7 corrects the command value is similar to that in the case that the command of the correction value is not issued.

In the feedforward control, the correction is performed based on a differential value (that is, a rate of change) of the command value. In the correction performed by the feedforward control, although the smooth control can be performed in an interval where the command value changes linearly, the correction amount is rapidly modified in the timing of changing the corrected command value from the fall, and therefore, a torque waveform becomes slightly vibrational.

On the other hand, in the correction performed by the (the correction performed with the command value correcting device 7), the future controlled variable is predicted using the internal model and the near-future command value Accordingly, the command value correcting device 7 can perform the correction without rapidly modifying the correction amount, namely, without wasteful motion.

Implementable Example by Software

The control block (particularly, the reference command value acquiring part 11, the controlled variable acquiring part 12, the command value corrector 13, the corrected command value output part 14, and the model predictive controller 131) of the command value correcting device 1 and the command value correcting device 7 may be constructed with a logic circuit (hardware) formed in an integrated circuit (IC chip), or implemented by software using the CPU.

In the latter, the command value correcting device 1 and the command value correcting device 7 include the CPU that executes a command of the program that is of software implementing each function, the ROM (Read Only Memory) or storage device (referred to as a "recording medium") in which the program and various pieces of data are stored and readable through the computer (or the CPU), and the RAM (Random Access Memory) in which the program is expanded. The computer (or the CPU) reads the program from the recording medium to execute the program, thereby achieving the object of the present invention. A "non-transient physical medium" such as a tape, a disk, a card, a semiconductor memory, and a programmable logic circuit can be used as the recording medium. The program may be supplied to the computer through any transmission medium, such as a communication network and a broadcasting wave, which can transmit the program. The present invention can be implemented even in a mode of a data signal. The data signal is embedded in a carrier wave, and the program is provided by electronic transmission in the data signal.

The present invention is not limited to the embodiments, but various changes can be made without departing from the scope of the claims. It is noted that the embodiment obtained by a combination of different embodiments is also included in the technical scope of the present invention.

The invention claimed is:

1. A correction device in which:
   a command value for controlling a control target in a plurality of control cycles each having a given time interval is generated from target orbit data, the command value generated in each control cycle in which the control target is controlled, the command value corrected in a current control cycle by comparing the command value with a current control cycle controlled variable comprising feedback information output from the control target in the current control cycle to generate a current control cycle corrected command value, and
   the current control cycle corrected command value and the current control cycle controlled variable are received by a feedback control system that processes the current control cycle corrected command value and the current control cycle controlled variable and causes the current control cycle controlled variable of the control target to follow the command value in the current control cycle, the correction device comprising logic programmed to perform operations comprising operation as:
- a reference command value acquiring part configured to acquire the command value in the current control cycle;
- a controlled variable acquiring part communicably coupled with the control target and configured to acquire the current control cycle controlled variable of the control target in the current control cycle;
- a command value corrector communicably coupled with the reference command value acquiring part and the controlled variable acquiring part and configured to generate the current control cycle corrected command value in the current control cycle based on the acquired command value and the current control cycle controlled variable;
- a corrected command value acquiring part communicably coupled with the command value corrector and configured to receive the current control cycle corrected command value and output the current control cycle corrected command value to the feedback control system in the current control cycle; and
- a learning controller communicably coupled with the control target, the controlled variable acquiring part, and the reference command value acquiring part and configured to output a correction amount of the command value generated in each control cycle from next target orbit data using the current control cycle controlled variable of the control target corresponding to the target orbit data acquired with the controlled variable acquiring part and the command value of the current control cycle, wherein the feedback control system receives the current control cycle controlled variable and the current control cycle corrected command value, the reference command value acquiring part receives a sum of the correction amount and the command value of the current control cycle, and the controlled variable acquiring part acquires the current control cycle controlled variable of the control target with respect to the target orbit data.

2. The correction device according to claim 1, wherein the command value corrector comprises a model predictive controller, which uses models of the feedback control system and the control target to generate the current control cycle corrected command value using the acquired command value and the current control cycle controlled variable.

3. The correction device according to claim 1, wherein the feedback control system comprises a servo driver in which a servo motor is the control target.

4. The correction device according to claim 1, wherein
the controlled variable acquiring part acquires the current control cycle controlled variable of the control target of each of a plurality of feedback control systems; and
the command value corrector corrects the acquired command value using the current control cycle controlled variable of the control target of each of the plurality of feedback control systems to output current control cycle corrected command values for each of the plurality of feedback control systems.

5. A method for controlling a correction device that:
corrects a command value for controlling a control target in a plurality of control cycles each having a given time interval generated from target orbit data, the command value generated in each control cycle in which the control target is controlled, the command value corrected in a current control cycle by comparing the command value with a current control cycle controlled variable comprising feedback information output from the control target in the current control cycle to generate a current control cycle corrected command value, and
receives the current control cycle corrected command value and current control cycle controlled variable with a feedback control system that processes the current control cycle corrected command value and the current control cycle controlled variable and causes the current control cycle controlled variable of the control target to follow the command value in the current control cycle, the method comprising:
acquiring, at a controlled variable acquiring part, the current control cycle controlled variable of the control target in the current control cycle with respect to the target orbit data;
outputting, with the controlled variable acquiring part, the current control cycle controlled variable to the feedback control system;
acquiring, at a reference command value acquiring part, the command value in the current control cycle;
receiving, at a command value corrector, the acquired command value from the reference command value acquiring part and the current control cycle controlled variable from the controlled variable acquiring part;
generating, with the command value corrector, the current control cycle corrected command value based on the acquired command value and the current control cycle controlled variable;
receiving, at a corrected command value acquiring part, the current control cycle corrected command value from the command value corrector;
outputting, with the corrected command value acquiring part, the current control cycle corrected command value to the feedback control system;
receiving, at a learning controller, the current control cycle controlled variable from the controlled variable acquiring part;
generating, with the learning controller, a correction amount of the command value generated in each control cycle from next target orbit data using the current control cycle controlled variable of the control target corresponding to the target orbit data and the command value of the current control cycle; and
receiving, at the reference command value acquiring part, a sum of the correction amount and the command value of the current control cycle.

6. The method according to claim 5, wherein generating, with the command value corrector, the current control cycle corrected command value based on the acquired command value and the current control cycle controlled variable comprises generating, using a model predictive controller which uses models of the feedback control system and the control target, the current control cycle corrected command value based on the acquired command value and the current control cycle controlled variable.

7. The method according to claim 5, wherein the feedback control system comprises a servo driver in which a servo motor is a control target.

8. The method according to claim 5, further comprising:
acquiring, at a learning controller, the current control cycle controlled variable of the control target corresponding to the target orbit data acquired with the controlled variable acquiring part and the command value;

generating, with the learning controller, the correction amount of the command value generated in each control cycle from next target orbit data using the current control cycle controlled variable of the control target corresponding to the target orbit data acquired with the controlled variable acquiring part and the command value of the current control cycle;

outputting, from the learning controller, the correction amount; and receiving, at the reference command value acquiring part, a sum of the correction amount and the command value.

9. The method according to claim 5, wherein the controlled variable acquiring part acquires the current control cycle controlled variable of the control target of each of a plurality of feedback control systems; and the command value corrector corrects the acquired command value using the current control cycle controlled variable of the control target of each of the plurality of feedback control systems to output current control cycle corrected command values for each of the plurality of feedback control systems.

10. A non-transitory computer-readable storage medium storing instructions to control a correction device that:

corrects a command value for controlling a control target in a plurality of control cycles each having a given time interval generated from target orbit data, the command value generated in each control cycle in which the control target is controlled, the command value corrected in a current control cycle by comparing the command value with a current control cycle controlled variable comprising feedback information output from the control target in the current control cycle to generate a current control cycle corrected command value, and receives the current control cycle corrected command value and current control cycle controlled variable with a feedback control system that processes the current control cycle corrected command value and the current control cycle controlled variable and causes the current control cycle controlled variable of the control target to follow the command value in the current control cycle, the instructions when executed, causing a controller to perform operations comprising:

acquiring, at a controlled variable acquiring part, the current control cycle controlled variable of the control target in the current control cycle with respect to the target orbit data;

outputting, with the controlled variable acquiring part, the current control cycle controlled variable to the feedback control system;

acquiring, at a reference command value acquiring part, the command value in the current control cycle;

receiving, at a command value corrector, the acquired command value from the reference command value acquiring part and the current control cycle controlled variable from the controlled variable acquiring part;

generating, with the command value corrector, a current control cycle corrected command value based on the acquired command value and the current control cycle controlled variable;

receiving, at a corrected command value acquiring part, the current control cycle corrected command value from the command value corrector;

outputting, with the corrected command value acquiring part, the current control cycle corrected command value to the feedback control system;

receiving, at a learning controller, the current control cycle controlled variable from the controlled variable acquiring part;

generating, with the learning controller, a correction amount of the command value generated in each control cycle from next target orbit data using the current control cycle controlled variable of the control target corresponding to the target orbit data and the command value of the current control cycle; and receiving, at the reference command value acquiring part, a sum of the correction amount and the command value of the current control cycle.

* * * * *